United States Patent [19]

Blinow

[11] 4,412,276

[45] Oct. 25, 1983

[54] STROBE REFLECTOR ASSEMBLY

[75] Inventor: Igor Blinow, Millis, Mass.

[73] Assignee: Polaroid Corporation, Cambridge, Mass.

[21] Appl. No.: 327,920

[22] Filed: Dec. 7, 1981

[51] Int. Cl.³ .............................................. F21V 7/00
[52] U.S. Cl. ..................................... 362/278; 362/16; 362/223; 362/307; 362/308; 362/309; 362/310; 362/320; 362/375
[58] Field of Search ................. 362/278, 320, 223, 16, 362/307, 308, 309, 310, 375

[56] References Cited

U.S. PATENT DOCUMENTS

3,654,471 4/1972 Nilsson ................................. 362/320
4,061,422 12/1977 Geurts et al. ........................ 362/320
4,317,625 3/1982 Van Allen .............................. 362/16

Primary Examiner—Stephen J. Lechert, Jr.
Attorney, Agent, or Firm—John S. Vale

[57] ABSTRACT

A strobe lighting unit—and a reflector assembly forming part thereof—include a concave reflector having a predetermined shape, typically including a parabolic cross-section. The reflector is formed in situ as part of an assembly process by pressing a thin precut planar blank of reflective material, preferably an aluminum alloy foil having selected mechanical properties, into a die cavity in the reflector housing with a conforming die plunger to bend the blank into the predetermined shape. During the bending process residual tension forces are induced intentionally into the blank and these forces urge the foil into contact with surfaces defining the die cavity to supportively maintain the reflector in the predetermined shape.

5 Claims, 8 Drawing Figures

STROBE REFLECTOR ASSEMBLY

BACKGROUND OF THE INVENTION

The present invention relates to the field of photography and, more specifically, to electronic strobe lighting units adapted to be built into or detachably mounted on cameras, and to reflectors and reflector assemblies forming part of such strobe units.

Compact, highly-efficient, electronic strobe lighting units are rapidly becoming the preferred source of artificial illumination for making flash and fill flash exposures with automatic cameras designed for the mass amateur market. The availability of high-speed color films (ASA 400–600) for amateur use has substantially reduced the light output requirements for these lighting units and, coupled with efficiency improvements in the light emitting gas discharge tubes and associated reflectors, their size has been scaled down to the point where it is practical to build them into compact cameras without inhibiting portability. Also, quenchable strobe units have been integrated into automatic exposure control systems which operate in both flash and proportional fill flash modes thereby substantially increasing the utilization of these lighting units for photographing both indoor and outdoor scenes.

Quantitatively, strobe units are rated in terms of peak light output power (effective range), recycle time, and the number of flashes per set of batteries. Qualitative figures of merit, however, define the light output characteristics in terms of wavelength spectrum, color temperature and optical performance in terms of field coverage (as it relates to the field of view of the camera lens) and the distribution of light intensity over the field of coverage.

These last-mentioned optical parameters are defined by the design of the reflector, the location of the light emitting gas discharge tube in relation thereto, the design of the light transmissive face plate (usually a Fresnel lens) and another factor that is not quite so obvious, the manufacturing tolerances to which the individual components are made and thereafter assembled.

For representative examples of contemporary optical design activity in this field, reference may be had to commonly-assigned copending applications, U.S. Ser. No. 183,105 filed on Sept. 2, 1980; U.S. Ser. No. 172,778 filed on July 28, 1980; and U.S. Ser. No. 175,060 filed on Aug. 4, 1980.

The first application discloses a reflector having a parabolic cross-section shape in the form of a seventh order polynomial which, when used with an artificial source of illumination of predetermined geometry, projects a light beam having substantially uniform intensity within a given solid angle.

The latter applications relate to a strobe unit having a reflector cross-section shape in the form of a high order polynomial and a strobe tube which is disposed with its center offset with respect to the reflector's plane of symmetry to provide a vertically asymmetric distribution of illumination intensity over the field of coverage so that higher intensities occur at the central upper part of the picture area where the most important subject matter of a scene is most often found. By selectively concentrating the light output in this manner, the effective range of the strobe unit is extended.

The nature of the technical problems encountered in the manufacture and assembly of such a high quality strobe unit to insure that the optical benefits of such a sophisticated design will be realized when the unit is incorporated into a camera is disclosed in commonly-assigned copending applications U.S. Ser. No. 175,250 filed on Aug. 4, 1980 and U.S. Ser. No. 187,311 filed on Sept. 15, 1980.

The strobe unit described therein comprises a housing; a main reflector section having a high order polynomial cross section; a pair of side reflector plates enclosing the open lateral ends of the main reflector section; a flash tube; and a Fresnel lens face plate that snaps onto the housing in front of the reflector and tube assembly.

The latter application is directed to a method for making a metal stamping die for forming the concave-shaped main reflector section in a manner to compensate for the spring back characteristics of the sheet metal used to form the reflector. First, a test die is made and the resultant reflector section is measured to determine a calibration function which is then used to determine a final die shape that will produce the desired polynomial curve following die forming and spring back.

The former application relates to a high quality strobe unit comprising a multi-component reflector (i.e., a generally parabolic main section and two flat side pieces) that is adapted to be assembled on a mandrel and then inserted into a receiving cavity in the housing wherein tabs on the reflector assembly fit into receiving notches to accurately locate it therein. After the reflector is located in the housing, the strobe tube is inserted through elongated openings in the reflector side pieces and is urged against tapered locating surfaces thereof by elastic rings or grommets for accurately positioning the tube in predetermined offset relation to the apex of the parabola. Thereafter, a face plate, having an integrally formed lenticular section thereon, is snap fitted onto the housing.

While this type of assembly performs satisfactorily, it is relatively expensive to produce because the reflector components must be first separately formed and preassembled and the general assembly technique employed (e.g., having to elongate the elastic grommets and hook them over capturing detents on the housing) do not readily lend themselves to automatic assembly methods.

U.S. Pat. No. 4,223,372 discloses several different embodiments of a small compact strobe unit. In some embodiments, the reflector is a one piece stamping made of aluminum which is inserted into a receiving cavity or frame in the strobe housing. Other embodiments employ a molded plastic housing, or plastic insert therefor, having an integrally molded plastic member that has the curved surface of a reflector. This reflector surface is then coated with a thin layer of aluminum, using a vapor deposition process, to give it the required reflective property.

Both types of construction have certain characteristics which inhibit cost effective automatic assembly. If the reflector is formed separately, before initiation of the assembly process, labor and material costs accumulate for post-forming steps such as removing the reflector from the forming die or mold; inspecting it for defects; loading it into a tote tray or other container to protect the reflector from damage during storage and transport to the assembly area, and then once again handling the reflector to insert it into its housing. Reflectors that are coated with a thin aluminum film must be batch processed for the vapor deposition step thereby precluding the use of more cost-effective continuous in-line assembly methods.

Also, when the strobe tube is flashed, a significant amount of heat is generated which must be effectively dissipated without causing distortion or other damage to the strobe unit components. Because the vapor deposited aluminum film is so thin, it does not have sufficient thermal mass to serve as an adequate heat sink. Therefore, in order to prevent the film from charring or discoloring, especially near the parabola apex, it is usually necessary to provide a relatively thick metal heat sink on the back side of the molded plastic reflector. This just adds another component and assembly step which increase manufacturing costs.

Therefore, it is an object of the present invention to provide a high-quality strobe unit and reflector assembly forming part thereof which are simple in construction and easy to assemble.

It is another object to provide such a strobe unit and reflector assembly which can be produced at relatively low manufacturing cost while maintaining high performance standards.

Another object is provide such a strobe unit and reflector assembly which are compatible with automatic assembly techniques.

Yet another object is to provide a high quality strobe unit and reflector assembly forming part thereof wherein the reflector is formed during and is an integral part of the assembly process.

Another object of the invention is to provide a strobe unit and reflector assembly wherein the reflector serves as a heat distribution member for facilitating the dissipation of heat generated when the strobe tube is fired.

It is yet another object of the invention to provide an effective method for reducing the manufacturing cost of a high quality strobe unit and reflector assembly forming part thereof.

Other objects of the invention will, in part, be obvious and will, in part, appear hereinafter.

SUMMARY OF THE INVENTION

The present invention provides a high quality strobe lighting unit—and reflector assembly forming a part thereof—which includes a generally concave reflector having a predetermined shape, typically including a parabolic cross-section defined by a high order polynomial, for controlling the distribution of light intensity emitted from the unit.

The strobe unit includes a housing having an open ended cavity therein defined by surfaces which when engagingly contacted by reflective material supports the reflective material to form a reflector having the predetermined shape, a thin blank of light reflective material shaped to fit into the confines of the cavity and having residual tension forces that are induced therein for urging the material into contact with the cavity surfaces to form the reflector when the shape blank is retained in the cavity; means for retaining the shaped blank in the cavity; and a strobe tube assembly that is mounted on the housing in predetermined operative relation to the formed reflector.

In a preferred embodiment, the blank is formed from a thin metal sheet or foil which is precut to an initial shape and then is formed into the predetermined shape by pressing it into the die cavity with a conforming die plunger. Thus, the blank is formed by bending it into shape and the residual tension forces are induced therein as a result of this bending.

In the illustrated embodiment, the means for retaining the shaped blank in place includes a snap on cover plate member which compressively urges the reflector into the cavity so that the tension forces are directed to press the material into intimate contact with the surfaces defining the cavity.

The housing is preferably molded with a plastic material that is formulated to resist distortion from the heat generated when the strobe tube is flashed. The reflective material from which the reflector is formed is selected to have sufficient thermal conductivity and mass to distribute the heat over the cavity surfaces thereby avoiding heat concentrations or "hot spots" adjacent the strobe tube.

Advantageously, the strobe unit and reflector assembly are structured to facilitate automatic assembly, and a method for manufacturing is described wherein the in situ formation of the reflector is carried out as part of the assembly process.

BRIEF DESCRIPTION OF THE DRAWINGS

For a fuller understanding of the nature and objects of the present invention, reference should be had to the following detailed description taken in connection with the accompanying drawings wherein.

DESCRIPTION OF THE PREFERRED EMBODIMENT

Figure 1:
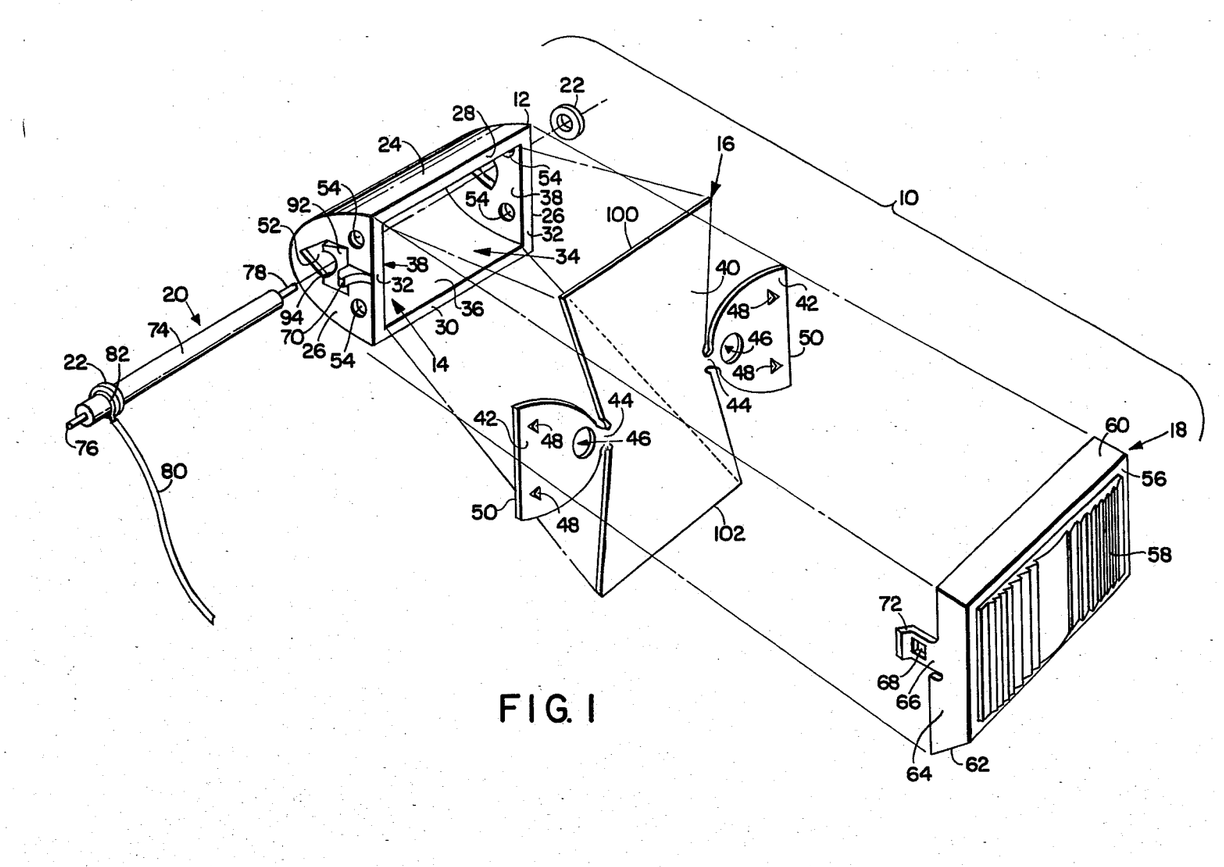
FIG. 1 is a perspective view of the components of a strobe unit embodying the present invention, shown in exploded fashion.

FIG. 1 shows an exploded view of the component parts of a compact, high-quality strobe flash illumination unit 10—and a reflector assembly forming part thereof—embodying the present invention. The illustrated unit 10 (shown assembled in FIG. 2) is configured to be built into a photographic apparatus, such as a camera, for providing artificial illumination directed at a scene to be photographed when the apparatus is operated in a flash or fill flash exposure mode. Alternatively, strobe unit 10 may be incorporated into a strobe lighting accessory that is adapted to be detachably mounted on a camera.

The component parts include a housing 12 having an open ended die cavity 14 therein; a preformed blank of thin metal reflective material 16 that is adapted to be pressed into cavity 14 with a later-to-be-described complementary die plunger to form a generally concave reflector 16a (see FIGS. 4, 6 and 7) in situ during the assembly process; a front cover plate member 18; an elongated light emitting gas discharge or strobe tube assembly 20; and a pair of elastic O-rings or grommets 22 for maintaining tube assembly 20 at a predetermined position relative to reflector 16a.

Housing 12 is preferably a molded plastic part which includes a curved main wall section 24 formed to have a parabolic shaped longitudinal cross-section, and a pair of integrally formed side walls 26 having a conforming parabolic shape enclosing the lateral ends of main wall section 24.

Top and bottom forward horizontal ends 28 and 30, respectively, of main wall section 24 cooperate with forward vertical ends 32 of side walls 26 to define a rectangular front opening 34 communicating with cavity 14.

Cavity 14 is defined by the parabolic interior surface 36 of main wall section 24 and cooperating, substantially planar, interior side surfaces 38 of the laterally spaced side walls 26. As will become apparent later, main surface 36 and the two side surfaces 38 serve two functions. First, they cooperate to form a female metal die forming cavity 14 for facilitating the shaping of blank 16 into reflector 16a which is designed to have a precise predetermined shape for defining its optical characteristics. After the reflector forming step, these same cavity defining surfaces then serve to support the reflector 16a in a manner to maintain it in that predetermined shape.

The preformed or precut blank of reflective material 16 is preferably formed from a thin sheet of metal, such as aluminum, having preferred reflective, thermal and mechanical properties to be described in detail later.

Blank 16 is substantially flat and includes a main section 40 that is dimensioned and shaped (somewhat like a butterfly) to conform to the main interior surface 36 when blank 16 is pressed into cavity 14 and a pair of integrally formed parabolic shaped side sections 42 that are connected to the mid-portion of main section 40 by integrally formed bendable tab portions 44 and are configured and dimensioned to overlie the interior surfaces 38 of side walls 26 when reflector 16a is formed.

Each of the side sections 42 includes a stamped hole 46 therein, adjacent its corresponding tab 44, and a pair of rearwardly extending pierced V-shaped tabs or barbs 48 disposed in vertically aligned spaced relation adjacent the lateral vertical edge 50 of each side section 42.

Figure 4:
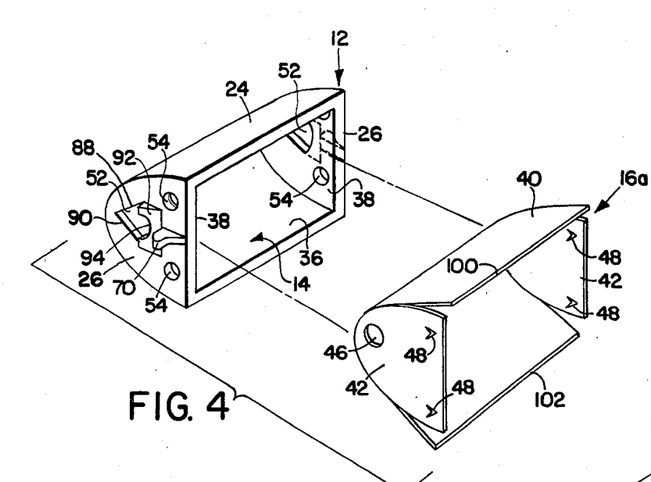
FIG. 4 is a perspective view of the strobe unit housing and a formed reflector that has been removed from the die cavity therein to show how it "springs back" to an unstressed condition when removed from its confining environment.
Figure 6:
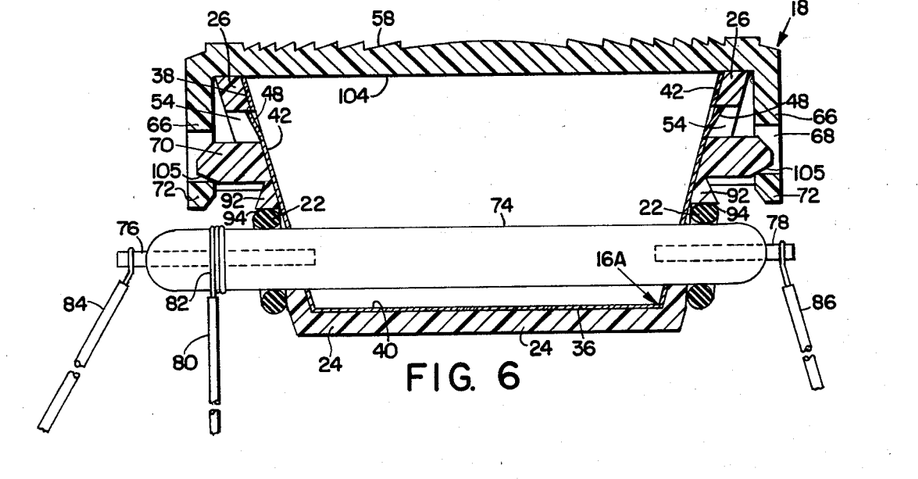
FIG. 6 is a cross-sectional view of the strobe unit taken along lines 6—6 of FIG. 2.
Figure 7:
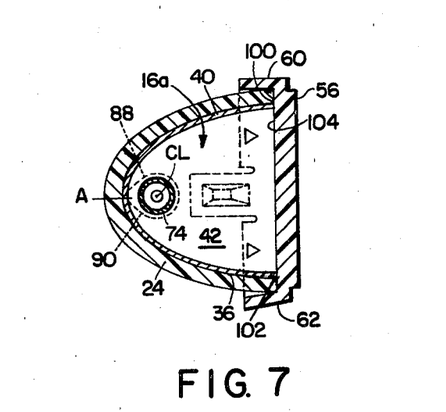
FIG. 7 is a cross-sectional view of the strobe unit taken along lines 7—7 of FIG. 2.

When blank 16 is introduced into cavity 14 to form the reflector 16a shown in FIGS. 4, 6 and 7, the holes 46 are aligned with corresponding openings 52 in housing side walls 26 for receiving the elongated strobe tube assembly 20 therein. As best shown in FIG. 6, V-shaped barbs 48 which extend outwardly from the back side of side sections 42 are captured in integrally molded openings 54 in the housing side walls 26 so as to retain the formed reflector 16a in cavity 14 following the removal of the die plunger.

The front cover plate member 18 is molded from a transparent plastic material and includes a generally rectangular forward wall 56 having an integrally molded Fresnel lens 58 thereon for controlling the horizontal distribution of light emitted from unit 10; and an integrally molded peripheral section joining wall 56 and including a top wall 60, an opposed bottom wall 62, and a pair of side walls 64.

Figure 2:
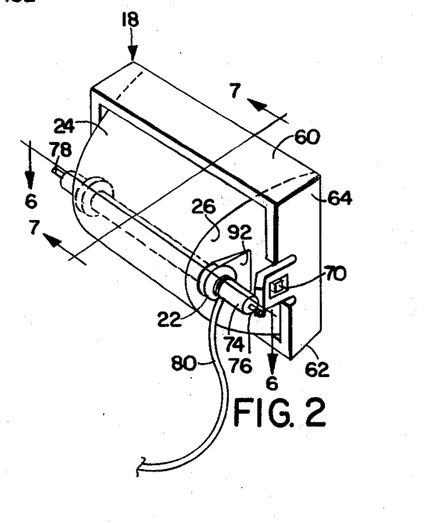
FIG. 2 is a rear perspective view of the assembled strobe unit.

Each side wall 64 includes an integrally molded and rearwardly extending resilient latching tab 66 having an integrally formed opening 68 for receiving a complementary latching protrusion or detent 70 integrally molded on the exterior side of each housing side wall 26, and an outwardly turned ramped trailing end portion 72 for following the contours of detent 70 during assembly to deflect latching tab 66 outwardly so it can ride up over detent 70 to position opening 68 in line with the outboard end thereof whereupon latching tab 66 snaps inwardly to its unstressed latching position, shown in FIG. 2, to thereby couple member 18 to housing 12.

As best shown in FIGS. 1, 2 and 6, the strobe tube assembly 20 comprises an elongated hollow glass cylindrical tube 74 filled with a mixture of inert rare gases (e.g., xenon, krypton, etc.) under low pressure and having positive and negative electrodes 76 and 78 fused into the terminal ends thereof; and a firing electrode which takes the form of an insulated wire 80 having one bare end 82 thereof tightly coiled around the exterior of tube 74 adjacent electrode 76. After the components of strobe unit 10 are assembled, lead wires 84 and 86 (see FIG. 6) will be electrically connected (soldered or coil wrapped) to electrodes 76 and 78. When installed in a complete flash system, these two wires will be connected across the main high voltage storage capacitor. For firing, an instantaneous high voltage is applied to the firing electrode to ionize the gas, thus lowering its resistance, allowing the capcitor to discharge its energy through the tube in the form of a flash of light.

For strobe unit 10 to meet its design goal, in terms of tightly controlling the distribution of light intensity, it is critical that the reflector 16a have a precisely defined predetermined shape and that tube 74 be located accurately with respect to reflector 16a. This means the longitudinal axis of the reflector 16a and tube 74 are to be substantially parallel and the center line, CL, of tube 74 is to be disposed at a precise predetermined location with respect to the apex, A, of the parabolic cross-section.

In the illustrated embodiment, the longitudinal cross-section of reflector 16a, as best shown in FIG. 7, is in the form of a high order polynomial that is bilaterally symmetric about a horizontal plane passing through the apex and the strobe tube 74 is positioned with its center offset with respect to the plane of symmetry so that it is forward of the apex, A, and slightly below the plane of symmetry. For a more detailed description the shape of reflector 16a and the placement of the strobe tube 74 relative thereto, reference may be had to the previously-noted, commonly-assigned copending application U.S. Ser. Nos. 183,105; 172,778; 175,060; 175,250 and 187,311, all of which are incorporated by reference herein. It will be understood, however, that the inventive concepts disclosed herein are not limited in their use to the particular type of reflectors described in this specification or in the above-mentioned applications. That is, this invention may be used with other types of reflectors having a generally concave shape.

In the illustrated embodiment, the two openings 52 in housing side walls 26 are substantially teardrop-shaped and include a generally circular forward portion, dimensioned to allow tube 74 to be easily inserted therethrough, and a rearwardly extending tapered or V-notch tube locating portion defined by upper and lower tapered edges 88 and 90. As best shown in FIG. 7, when tube 74 is urged rearwardly in openings 52, the exterior surface of tube 74 engages the locating surfaces 88 and 90 only at two tangential points therealong to fix the location of tube 74 with respect to the main portion interior surface 36. By carefully locating the tapered surfaces in relation to surface 36, taking into consideration the outside diameter of tube 74 and the thickness of the sheet metal blank 16 from which reflector 16a is formed, the center line, CL, of tube 74 may be quite accurately located with respect to the apex of reflector 16a and the horizontal plane of symmetry of its parabolic cross-section.

The strobe tube assembly 20 is secured at its operative position on housing 12 by the pair of elastic O-rings 22 which cooperate with a pair of integrally molded semi-circular compression collars 92 located on and extending outwardly from the exterior surfaces of housing side walls 26 forwardly adjacent the leading end of the corresponding openings 52.

The O-rings 22 are dimensioned to have an inside diameter that is slightly smaller than the outside diameter of tube 74 so that they are stretched when slipped onto the ends thereof to establish a friction fit therebetween. Initially, strobe tube assembly 20 is provided with one O-ring 22 prepositioned on one end thereof just inside the firing electrode wire 82. After reflector 16a is in place within cavity 14, the opposite end of tube 74 is slidably inserted through openings 52 (and the aligned corresponding openings 46 in the side portions of reflector 16a) until the prepositioned ring 22 abuts the exterior surface of the facing side wall 26 and the forwardmost exterior portion of that ring is in engagement with a semi-circular compression surface 94 of the corresponding collar 92. Then, the second O-ring 22 is slipped onto the opposite end of tube 74 and is positioned up against the side of housing 12 in the same manner.

The frictional engagement of the O-rings 22 with tube 74 and their abutment against the side walls 26 fixes the lateral position of tube 74 relative to housing 12. The compression surfaces 94 of collars 92 are dimensioned to have a slightly smaller radius of curvature than the O-rings 22 and are located longitudinally with respect to the tapered locating surfaces 88 and 92 so that the forward portion of the rings 22 have to be press fitted into the collars 92 and are thereby compressed, as shown in FIG. 6, to provide a reactive biasing force on the tube 74, urging it rearwardly into positive tangential engagement with locating surfaces 88 and 90. Thus, the O-rings 22, the exterior surfaces of side walls 26 adjacent openings 52, the compressions collars 92 and the tapered locating surfaces 88 and 90 all cooperate to accurately fix the longitudinal and lateral position of strobe tube assembly 20 with respect to the cavity defining interior surfaces 36 and 38.

Now, the process of forming reflector 16a from the blank 16 will be discussed with reference to FIGS. 1 and 3-7.

Figure 3:
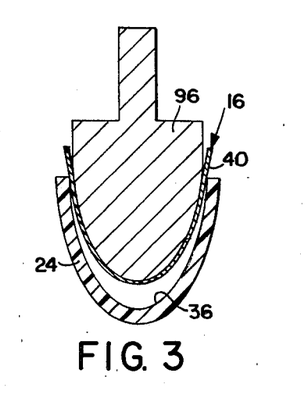
FIG. 3 is a longitudinal cross-sectional view showing a die plunger pressing a blank of reflective material into a die cavity formed in the strobe unit housing.
Figure 5:
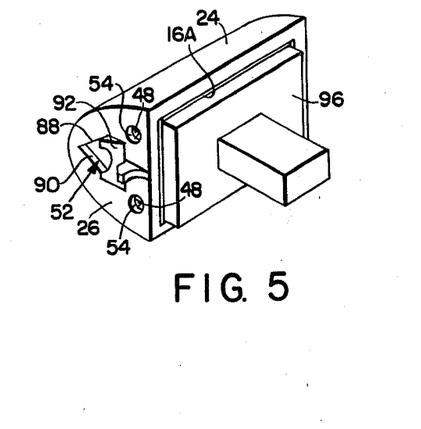
FIG. 5 is a perspective view of the strobe unit housing showing a die plunger at its fully inserted position within the cavity.

The blank 16 is configured to be centrally positioned over the opening 34 in housing 12 and pressed into the die forming cavity 14 with a complementary die plunger 96 shown in FIGS. 3 and 5. Those skilled in the art will appreciate that housing 12 is releasably held in an appropriate fixture and plunger 96 is mounted on an aligned ray to facilitate the reflector formation step, but these components have not been shown in the drawings for the sake of visual clarity.

During the reflector formation process, the blank 16 is essentially bent into the shape shown in FIG. 4 by compressing it between the die cavity 14 and the plunger 96 so that the main section 40 takes on a conforming parabolic shape overlying cavity surface 36 and the side sections 42 are bent forwardly at tabs 44 to conform to and overlie the corresponding interior surfaces 38 of the side walls 26.

In a preferred embodiment, blank 16 is formed from a thin sheet of aluminum alloy foil that has preferred mechanical properties, designated by an alloy number and temper code, and a thickness selected in accordance with the particular size (degree of curvature) of the reflector 16a to be formed for tailoring its formability characteristics to optimize the reflector formation process embodying the present invention. More specifically, the combination of foil thickness and its mechanical properties is selected so that blank 16 is readily formed into the desired shape without causing the material to kink or crease and, as a result of the bending process, residual tension forces are induced intentionally into the reformed reflector 16a which tend to urge the main section 40 into intimate contact with cavity surface 36 and the side sections 42 into intimate contact with the interior surfaces 38 of the corresponding housing side walls 26.

Stated another way, after reflector 16a is formed, it remains in a stressed (tensioned) condition within the confines of cavity 14 and is maintained in equilibrium in its preferred predetermined shape by the reactive compressive forces applied thereto by the cavity defining surfaces 36 and 38 and the interior surface of cover plate member forward wall 56. If, after formation, reflector 16a is removed from the confining environment of cavity 14, it will "spring back" to a formed but unstressed condition shown in FIG. 4 where the free ends of section 40 and side sections 42 are displaced outwardly.

In the illustrated embodiment, the housing front opening 34 measured approximately 0.67 inches × 1.0 inches and the depth of cavity 14 from the apex of parabolic surface 36 to a plane containing opening 34 measures approximately 0.49 inches. An appropriate blank 16 for this die cavity measures approximately 1.3 inches between the top and bottom edges of main section 40. The span between opposite lateral edges 50 of the two side sections 42 is approximately 1.72 inches and each section 42 measures approximately 0.5 inches between its lateral edge 50 and the center of its corresponding connecting tab 44.

For this size reflector, one preferred material is a 0.003 inch thick 5052 aluminum alloy-H38 temper-foil having a highly specular surface finish on the front side.

Another is a 0.003 inch thick 3004 aluminum alloy—H38 temper-foil having the same type of surface finish.

The reflective efficiency of this material is approximately 87%. As is well known in the art, reflective efficiency may be improved by about 5% by providing a multi layer optical coating on the front surface of the aluminum foil. One such composite material that has been made successfully formed into a reflector 16a employing the above-described in situ forming process is a 0.003 inch thick 1145-H19 aluminum alloy foil having a first thin layer of Schott glass no. 8329 vacuum deposited on the front surface of the aluminum foil which is then overcoated with a second thin layer of Patinal substance no. 1 listed in catalog no. 11611 of E. M. Chemicals Co.

It should be understood that the choice of suitable reflective materials for forming the illustrated reflector 16a is not limited to those identified above. The degree of curvature of the reflector determines the necessary stiffness of the material to meet the preferred formability characteristics—i.e., the ability to be bent into the predetermined curved shape without kinks or creases and, after formation, having residual tension forces that urge the reflector against the cavity defining surfaces. The stiffness in turn is defined by the combination of temper and thickness. Thus there are various combinations of temper and thickness that will provide the preferred formability characteristics for any given reflector shape. The stiffness requirement will change for different degrees of curvature. That is, the material should be stiffer for a larger radius of curvature than a small radius. Again various stiffness requirements may be met with different combinations of temper and thickness. The actual selection is generally done by empirical testing.

As best shown in FIGS. 5 and 6, when the blank 16 is formed by advancing die plunger 96 into its fully inserted position within cavity 14, the pierced tabs or barbs 48 are aligned with and protrude into the corresponding openings 54 in the housing side walls 26 to releasably hold the formed reflector 16a in cavity 14 thereby allowing die plunger 96 to be withdrawn while preventing reflector 16a from being propelled out of cavity 14 by the outwardly pushing induced tension forces within the reflector foil.

Blank 16 is intentionally dimensioned so that the top and bottom edges 100 and 102 of main section 40 and the lateral edges 50 of side sections 42 just slightly project beyond the edges of front opening 34 after die plunger 96 is removed. Thereafter, these edges are engaged by interior surface 104 of the cover plate member front wall 56 which presses inwardly on reflector 16a to compressively load it into cavity 14 when cover plate member 18 is snapped into place as shown in FIGS. 2, 6 and 7. That is, the cover plate member 18 serves to urge reflector 16a rearwardly into cavity 14 to counteract the induced tension forces therein which tend to urge it forwardly when the formed blank presses against surfaces 36 and 38. Thus, when confined by cover member 18 in this manner, the induced tension forces act to press the foil against these cavity surfaces to maintain it in the desired predetermined shape. It will be noted that the molded latching detents 70 on housing side walls 26 have beveled bearing surfaces 105 (see FIG. 6) for engaging the latching tabs 64 on cover plate member 18. The beveled surfaces 105 serve as cams for drawing cover plate member 18 rearwardly to maintain its compressive loading on the forward facing edges of reflector 16a.

Therefore, the shape and dimensions of the reflector 16a are determined by the shape and dimensions of the cavity defining surfaces 36 and 38, which can be quite accurately molded into housing 12 employing well-known precision molding techniques, and the selected thickness of the aluminum foil. When the foil is shaped to conform to these surfaces, such as by the die forming process disclosed herein, and is maintained in intimate contact therewith by the confining of the reflector 16a in cavity 14 in the manner described so that the residual tension forces act to push the foil outwardly against surfaces 36 and 38, then the reflective front surface of the foil defines a highly accurate optical surface which has the desired predetermined shape to control the vertical distribution of the intensity of the light emitted from strobe tube assembly 20.

As noted earlier, a flash of light emitted from strobe tube assembly 20 is accompanied by the liberation of a substantial amount of heat which must be dissipated in a manner that will not adversely affect the dimensional stability of reflector 16a or any other of the components of strobe unit 10.

In a preferred embodiment, the plastic housing 12 is formed of a plastic material that is formulated to resist head distortion and the aluminum reflector 16a, which has excellent thermal conductivity and is disposed in intimate contact with surfaces 36 and 38, is employed as a heat transfer member or conduit for distributing the heat to housing walls 24 and 26 in a manner inhibiting the creation of localized thermal hotspots which would tend to be concentrated at the apex of the reflector adjacent the strobe tube 74.

One suitable plastic material for housing 12 is sold under the tradename "Dylark" and comprises a composite of styrenic terpolymer and glass beads, approximately 20% by volume. The thickness of the foil, which contributes to the above-described desired formability characteristics, also provides sufficient thermal mass in the reflector to effectively transfer heat to the housing walls without causing distortion of the reflector shape.

Figure 8:
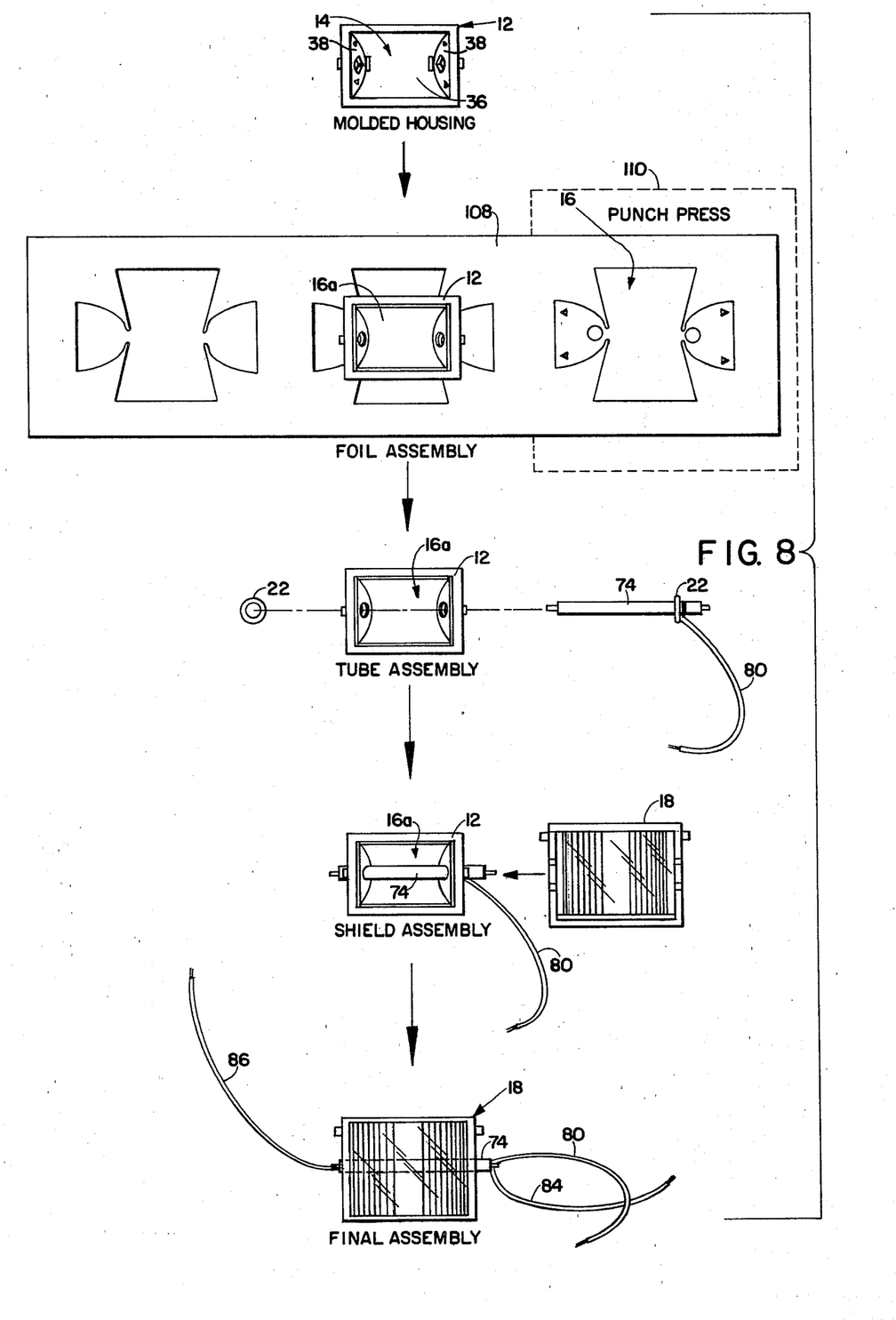
FIG. 8 is a diagrammatic flow chart of a method for automatically assembling a strobe unit embodying the present invention.

Advantageously, strobe unit 10 is constructed in a manner that facilitates automatic assembly. For example, unit 10 may be assembled in the sequence of steps shown in FIG. 8 utilizing appropriate fixtures and automatic assembly machines (not shown) that are well-known in the art.

The housing 12 is molded separately and is advanced (vertically as viewed in FIG. 8) to a holding fixture position below a strip of aluminum foil 108 of the type previously described. The foil is intermittently advanced (horizontally as viewed in FIG. 8) to the left so as first to pass through a punching station 110 to the right of housing 12. Here a punch press die cuts the blank 16 which is releasably retained on the foil strip 108 by very small easily-ruptured sections about the blank periphery that are intentionally only partially cut through. Upon indexing the foil strip 108 one increment to the left, the die cut blank 16 is automatically centered over the cavity opening 34. A die plunger 96 aligned with cavity 14 is then brought to bear on the blank and urges it downwardly thereby breaking it away from strip 108 and pressing it into cavity 14 to form reflector 16a. The plunger is retracted and the barbs 48 hold the form reflector 16 in cavity 14. Housing 12 is then moved to a strobe tube insertion station where an automatic machine inserts tube 74 through the aligned holes in the sides of the housing 12 and formed reflector 16a therein and slips on the second retaining grommet 22 on the protruding free end. From here the housing 12 is advanced to the next station where the cover plate member 18 is automatically snapped into place. At the final assembly station, the positive and negative electrode wires 84 and 86 are soldered to or coil wrapped on electrodes 76 and 78.

It should be understood that a reflector assembly, comprising housing 12, reflector 16a and a cover plate member 18 or some other equivalent means for compressively loading reflector 16 into cavity 14 and retaining it at its operative position therein, may be made by the method disclosed herein and the present invention is intended to be broad enough in its scope to cover such a structure that does not include the strobe assembly 20 or any other equivalent light emitting device.

Since certain changes may be made in the above-described strobe unit and/or reflector assembly without departing from the scope of the present invention, it is intended that all matter contained in the above description or shown in the accompanying drawings shall be interpreted as illustrative and not in a limiting sense.

I claim:

1. A strobe lighting unit including a reflector having a generally concave predetermined shape, said lighting unit comprising:

a housing having an open ended cavity therein defined by surfaces which when engagingly contacted by reflective material support said material to form a reflector having said predetermined shape;

a thin, substantially planar blank of bendable light reflective material having an initial shape that is formed into said predetermined shape in response to pressing said blank into said cavity with a conforming die plunger and having residual tension forces induced therein, as a result of such formation, that urge said material into contact with said cavity surfaces to form said reflector when said shaped blank is retained in said cavity;

means, on said blank and housing, for temporarily holding said shaped blank in said cavity while the die plunger is withdrawn to prevent displacement of said shaped blank from said cavity;

means for retaining said shaped blank in said cavity, said retaining means including a cover plate member being attachable to said housing for covering said open end of said cavity;

a light emitting strobe tube configured to be located at a predetermined position relative to said formed reflector; and means for locating said strobe tube at its said predetermined position and retaining it thereat.

2. The lighting unit of claim 1 wherein said blank is formed from a metal foil having sufficient thermal mass so that when it is formed into said reflector and is in contact with said cavity surfaces it serves as a heat transfer member for directing said heat to said housing.

3. The lighting unit of claim 1 wherein said housing has at least one opening in one of said cavity defining surfaces and said blank is initially planar and has a corresponding barb therein which protrudes into said opening to temporarily hold said shaped blank in said cavity.

4. The lighting unit of claim 1 wherein said housing includes a pair of opposed walls having openings therein through which said tube extends to locate it at its said predetermined position and said tube retaining means includes a pair of compression collars on said walls adjacent said openings and a pair of elasticized grommets that are slipped onto the opposite ends of said tube and are compressively received in said compression collars.

5. The lighting unit of claim 1 wherein said cover plate member engages edges of said shaped blank adjacent said open end and applies a compressive force to said shaped blank to urge it into said cavity.

* * * * *